United States Patent
Ko et al.

(10) Patent No.: US 10,642,109 B2
(45) Date of Patent: May 5, 2020

(54) DISPLAY APPARATUS AND DISPLAY PANEL FOR THE SAME

(71) Applicant: SAMSUNG ELECTRONICS CO., LTD., Suwon-si (KR)

(72) Inventors: Dae Sung Ko, Seoul (KR); Dong-Woon Kim, Seoul (KR); Seung San Han, Yongin-si (KR)

(73) Assignee: SAMGSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/794,750

(22) Filed: Oct. 26, 2017

(65) Prior Publication Data

US 2018/0120611 A1    May 3, 2018

(30) Foreign Application Priority Data

Oct. 27, 2016  (KR) .................. 10-2016-0141160

(51) Int. Cl.
*G02F 1/1345* (2006.01)
*G02F 1/1335* (2006.01)
*G02F 1/1333* (2006.01)

(52) U.S. Cl.
CPC ........ *G02F 1/1345* (2013.01); *G02F 1/13452* (2013.01); *G02F 1/133308* (2013.01); *G02F 1/133528* (2013.01); *G02F 2001/13332* (2013.01); *G02F 2001/133302* (2013.01); *G02F 2001/133325* (2013.01); *G02F 2202/023* (2013.01)

(58) Field of Classification Search
CPC ... G02F 1/133308; G02F 2001/133331; G02F 1/1345; G02F 1/133528; G02F 1/13452; G02F 2202/023; G02F 2001/133302; G02F 2001/13332; G02F 2001/133325
USPC .................................... 349/58, 149–152
See application file for complete search history.

(56) References Cited

U.S. PATENT DOCUMENTS

| | | | |
|---|---|---|---|
| 6,177,971 B1* | 1/2001 | Jung ................. | G02F 1/133308 349/60 |
| 8,436,958 B2* | 5/2013 | Lee ..................... | H01L 51/5243 257/686 |
| 2002/0135727 A1* | 9/2002 | Nakaminami ...... | G02F 1/13452 349/149 |
| 2014/0132879 A1* | 5/2014 | Li ....................... | G02F 1/13452 349/58 |
| 2015/0354784 A1* | 12/2015 | Oh ...................... | G02B 5/0242 349/71 |

FOREIGN PATENT DOCUMENTS

JP        2016-27352 A     2/2016

* cited by examiner

*Primary Examiner* — Charles S Chang
(74) *Attorney, Agent, or Firm* — Sughrue Mion, PLLC

(57) ABSTRACT

A display panel and display apparatus which includes the display panel are provided. The display apparatus includes a display panel configured to display a screen, the display panel including: a first glass substrate; a second glass substrate disposed behind the first glass substrate, wherein an end portion of the second glass substrate extends past an end of the first glass substrate such that the end portion of the second glass substrate is not overlapped by the first glass substrate; and a cover that covers a front surface of the end portion of the second glass substrate, wherein a front surface of the cover is coplanar with a front surface of the display panel.

14 Claims, 9 Drawing Sheets

DISPLAY APPARATUS AND DISPLAY PANEL FOR THE SAME

CROSS-REFERENCE TO RELATED APPLICATION

This application claims priority from Korean Patent Application No. 10-2016-0141160, filed on Oct. 27, 2016 in the Korean Intellectual Property Office, the disclosure of which is incorporated herein by reference.

BACKGROUND

1. Field

Example embodiments of the present disclosure relate to a display apparatus including a liquid crystal display (LCD) panel.

2. Description of the Related Art

A display apparatus, such as a television and a monitor, displays a screen based on received image signals.

The display apparatus includes a display panel to display a screen. An example of the display panel is an LCD panel which produces colors through liquid crystals.

The LCD panel may include a pair of glass substrates having a shape of a flat plate, and liquid crystals disposed between the pair of glass substrates. The LCD panel is connected to a source printed circuit board (PCB) through chip on films (COFs) to receive image signals from the source PCB through the COFs.

SUMMARY

One or more example embodiments provide a display apparatus having a bezel of a minimum width to support edges of a display panel, and a display panel for the display apparatus.

According to an aspect of an example embodiment, there is provided a display apparatus including: a display panel configured to display a screen, the display panel including: a first glass substrate; a second glass substrate disposed behind the first glass substrate, wherein an end portion of the second glass substrate extends past an end of the first glass substrate such that the end portion of the second glass substrate is not overlapped by the first glass substrate; and a cover that covers a front surface of the end portion of the second glass substrate, wherein a front surface of the cover is coplanar with a front surface of the display panel.

The display panel may further include: a first polarizing film disposed on a front surface of the first glass substrate, a front surface of the first polarizing film forming the front surface of the display panel; and a second polarizing film disposed on a rear surface of the second glass substrate, and the front surface of the cover is coplanar with the front surface of the first polarizing film.

An end portion of the first glass substrate may extend past an end of the first polarizing film such that the end portion of the first glass substrate is not overlapped by the first polarizing film, and the cover may cover a front surface of the end portion of the first glass substrate.

The display panel may further include a chip on film (COF) having an end connected to the front surface of the end portion of the second glass substrate, and the cover may cover the end of the COF.

The cover may be formed of a photocurable resin.

The COF may be bent and adhered to an end of the second glass substrate by an adhesive material, and the cover may support a bent portion and an adhered portion of the COF The end portion of the second glass substrate may be a lower end portion of the second glass substrate and the end of the first glass substrate may be a lower end of the first glass substrate, and the cover may cover the front surface of the lower end portion of the second glass substrate to form a lower end of the display panel.

The end portion of the second glass substrate may be an upper end portion of the second glass substrate and the end of the first glass substrate may be an upper end of the first glass substrate, and the cover may cover the front surface of the upper end of the second glass substrate to form an upper end of the display panel.

A lower end portion of the second glass substrate may extend past a lower end of the first glass substrate and an upper end portion of the second glass substrate may extend past an upper end of the first glass substrate such that the upper end portion and the lower end portion of the second glass substrate are not overlapped by the first glass substrate, and the cover may include: a first cover that covers a front surface of the upper end portion of the second glass substrate to form an upper end of the display apparatus; and a second cover that covers a front surface of the lower end portion of the second glass substrate to form a lower end of the display apparatus.

The display panel may further include liquid crystals disposed between the first glass substrate and the second glass substrate.

According to an aspect of another example embodiment, there is provided display panel including: a first glass substrate; a second glass substrate disposed behind the first glass substrate, wherein an end portion of the second glass substrate extends past an end of the first glass substrate such that the end portion of the second glass substrate is not overlapped by the first glass substrate; a first polarizing film disposed on a front surface of the first glass substrate; and a cover that covers a front surface of the end portion of the second glass substrate, wherein a front surface of the cover is coplanar with a front surface of the first polarizing film.

An end portion of the first glass substrate may extend past an end of the first polarizing film such that the end portion of the first glass substrate is not overlapped by the first polarizing film, and the cover may cover a front surface of the end portion of the first glass substrate.

The display panel may further include a chip on film (COF) having an end connected to the front surface of the end portion of the second glass substrate, wherein the cover covers the end of the COF.

The display panel may further include liquid crystals disposed between the first glass substrate and the second glass substrate.

The display panel may further include a second polarizing film disposed on a rear surface of the second glass substrate.

BRIEF DESCRIPTION OF THE DRAWINGS

The above and/or other aspects will become apparent and more readily appreciated from the following description of example embodiments, taken in conjunction with the accompanying drawings of which.

DETAILED DESCRIPTION

Figure 1:
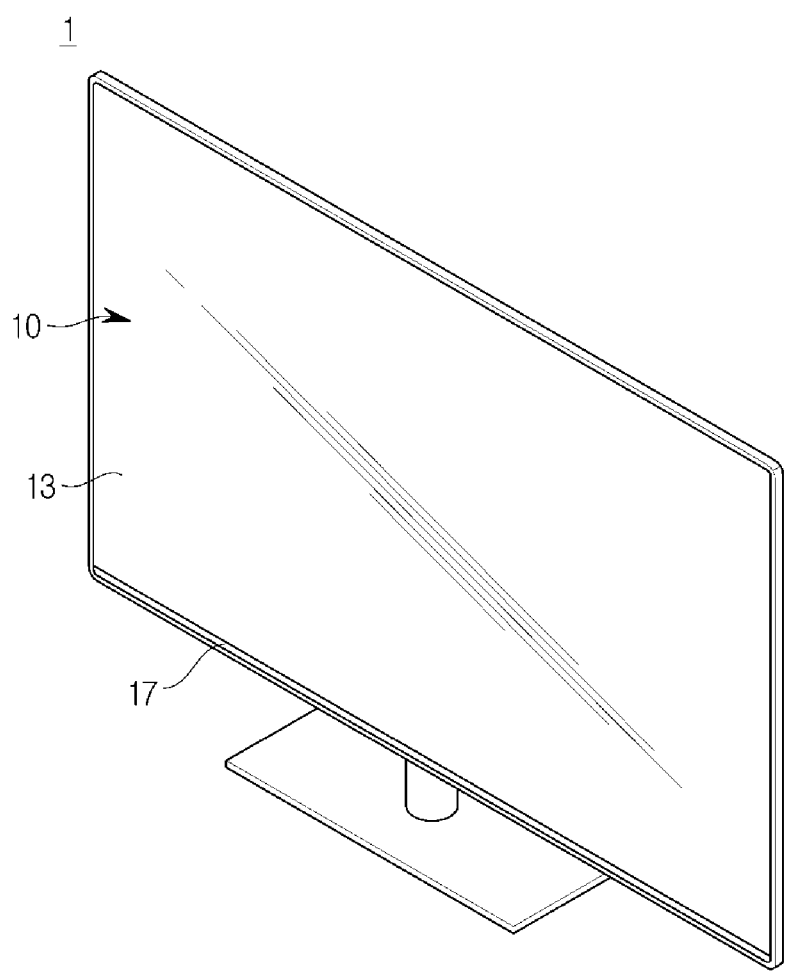
FIG. 1 is a perspective view illustrating a display apparatus according to an example embodiment.

Configurations of the example embodiments described herein and illustrated in the drawings are only examples, and thus it is to be understood that various modified examples, which may replace the example embodiments are possible.

Also, like reference numerals or symbols denoted in the drawings of the present specification represent members or components that perform the substantially same functions.

The terms used in the present specification are used to describe the example embodiments. Accordingly, it should be apparent to those skilled in the art that the following description of example embodiments is provided for illustration purpose only and not for the purpose of limiting the invention as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

In the following description, the terms "front end", "rear end", "upper portion", "lower portion", "upper end", and "lower end" are defined based on the drawings, and do not intend to limit shapes and locations of individual components.

Hereinafter, a display apparatus according to example embodiments will be described in detail with reference to the accompanying drawings.

Figure 2:
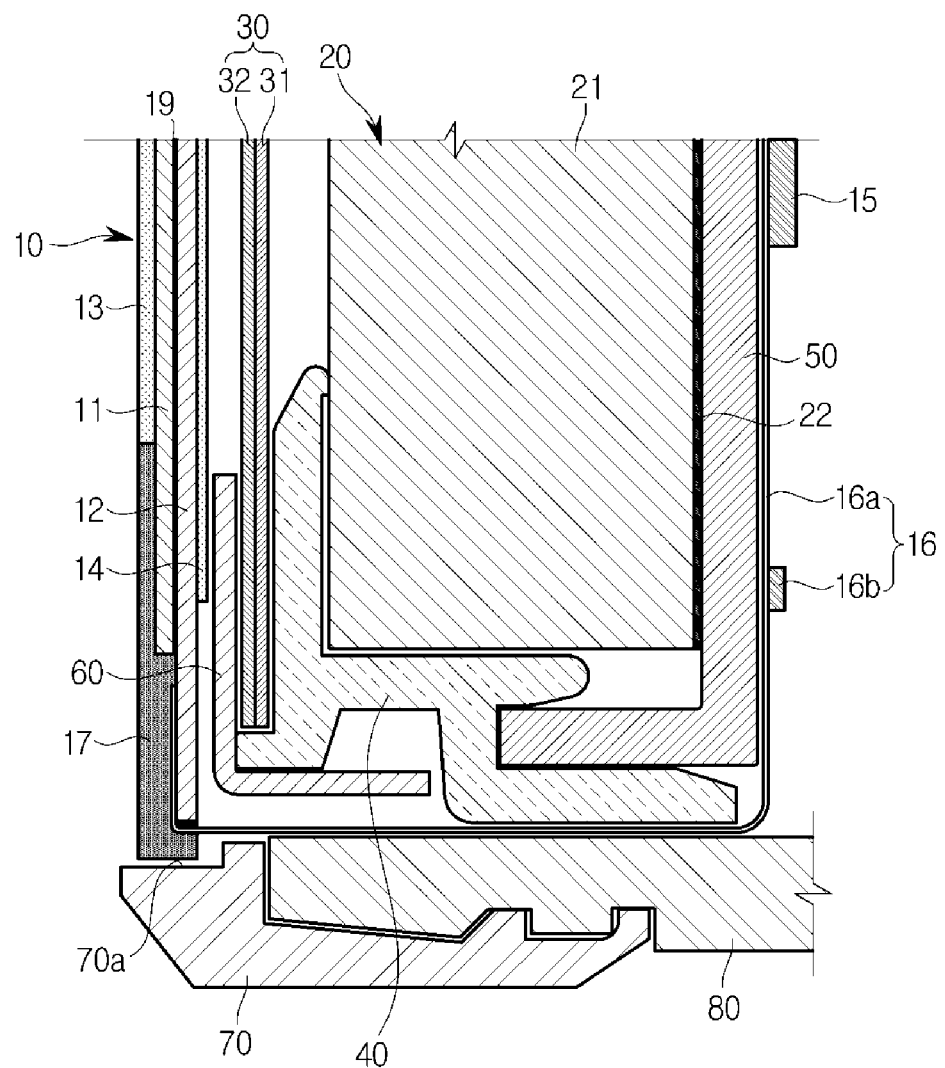
FIG. 2 is a cross-sectional view illustrating the display apparatus according to the example embodiment.

As shown in FIGS. 1 and 2, a display apparatus 1 according to an example embodiment may include a display panel 10, a backlight 20 disposed behind the display panel 10 to supply light to the display panel 10, and a plurality of optical sheets 30 disposed between the display panel 10 and the backlight 20 to improve optical characteristics of light supplied from the backlight 20.

In order to support the above-described components, the display apparatus 1 may include a middle mold 40 to support the optical sheets 30, a bottom chassis 50 coupled with a rear portion of the middle mold 40 to accommodate and support the backlight 20, and a source cover 60 coupled with a front portion of the middle mold 40 to support a substrate disposed on a lower, rear surface of the display panel 10.

Also, the display apparatus 1 may include a frame case 70 formed in the shape of a nearly rectangular ring and forming four surfaces of upper, lower, left and right sides of the display apparatus 1, and a rear case 80 coupled with a rear portion of the frame case 70 and forming a rear surface of the display apparatus 1. In the current example embodiment, a resting groove 70a on which four upper, lower, left and right edges of the display panel 10 are rested and supported may be provided in a front portion of an inner surface of the frame case 70 so that the display panel 10 is supported by the frame case 70. In the current example embodiment, a front end of the frame case 70 may protrude from the display panel 10 to form a bezel supporting the edges of the display panel 10.

The display panel 10 may be a liquid crystal display panel including a first glass substrate 11 having a shape of a rectangular flat plate, a second glass substrate 12 having a shape of a rectangular flat plate and disposed behind the first glass substrate 11, and liquid crystals 19 disposed between the first glass substrate 11 and the second glass substrate 12.

The display panel 10 may include a first polarizing film 13 disposed on a front surface of the first glass substrate 11, and a second polarizing film 14 disposed on a rear surface of the second glass substrate 12, wherein the front surface of the first polarizing film 11 forms a front surface of the display panel 10.

Also, the edges of the display panel 10 may include inactive areas on which no screen is displayed, and a black mask may be provided between the first glass substrate 11 and the second glass substrate 12 so as to prevent light from the backlight 20 from leaking out through the inactive areas of the display panel 10.

The backlight 20 may include a light guide plate 21 having a shape of a rectangular plate, a white reflective sheet 22 disposed behind the light guide plate 21 to reflect light, and a pair of light sources disposed to face left and right sides of the light guide plate 21 and configured to generate light.

The plurality of light sources may include PCBs extending vertically to correspond to the left and right sides of the light guide plate 21, and a plurality of light emitting diodes (LEDs) arranged vertically with predetermined intervals on the PCBs and configured to generate light.

The optical sheets 30 may include a diffuser sheet 31 to receive light emitted forward from the light guide plate 21 and to diffuse the light, and a dual brightness enhancement film (DBEF) sheet 32 disposed in front of the diffuser sheet 31, wherein the DBEF sheet 32 may be a high-brightness prism sheet.

Figure 3:
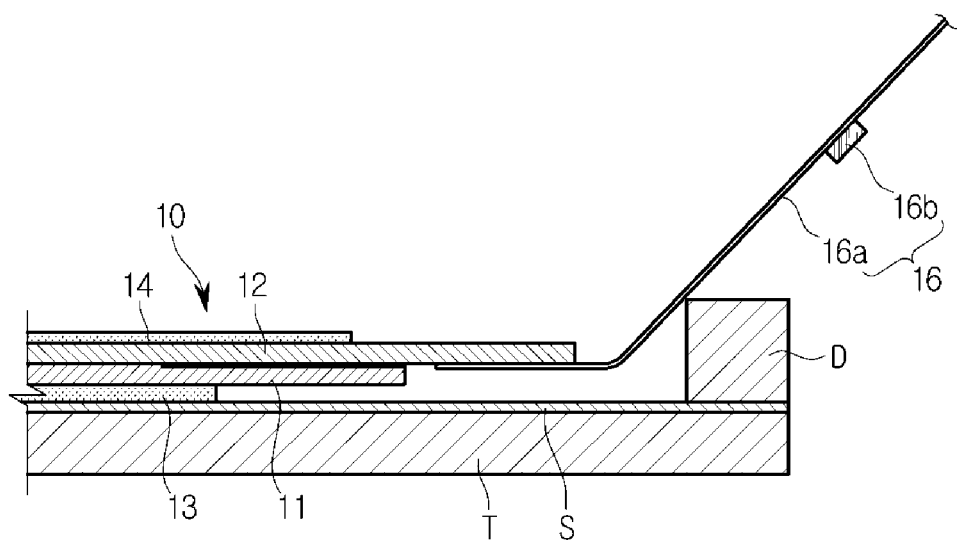
FIG. 3 is a perspective view illustrating the display panel, a COF, and a source PCB in the display apparatus according to the example embodiment.

A plurality of source PCBs 15 for controlling the display panel 10 may be connected to the display panel 10 through a plurality of Chip On Films (COFs) 16, as shown in FIGS. 2 and 3.

Each COF 16 may include a film PCB 16a formed as a film, and a semiconductor chip 16b mounted on the film PCB 16a. One end of each of the COFs 16s may be connected to a lower end of the display panel 10, and the other end of each of the COFs 16 may be connected to the source PCBs 15 to transfer an image signal from the source PCBs 15 to the display panel 10.

The source PCBs 15 may include two source PCBs 15 disposed side by side to the left and right of a lower, rear surface of the display panel 10, and the two source PCBs 15 may be connected to the display panel 10 through the plurality of COFs 16.

In order to connect the COFs 16, a lower end of the second glass substrate 12 may be stepped with respect to a lower end of the first glass substrate 11, so that a front surface of the lower end of the second glass substrate 12 is exposed in a front direction, and ends of the COFs 16 are connected to the exposed front surface of the lower end of the second glass substrate 12. In other words, a lower end portion of the second glass substrate 12 may extend past the lower end of the first glass substrate 11 such that the lower end portion of the second glass substrate 12 is not overlapped by the first glass substrate 11.

Also, in the current example embodiment, the first glass substrate 11 may be stepped with respect to the first polarizing film 13 so that a front surface of a lower end of the first glass substrate 11 is exposed in the front direction. In other words, a lower end portion of the first glass substrate 11 may extend past the lower end of the first polarizing film 13 such that the lower end portion of the first glass substrate 11 is not overlapped by the first polarizing film 13. Accordingly, in a lower end portion of the display panel 10, a step formed between the first polarizing film 13 and the first glass substrate 11, and a step formed between the first glass substrate 11 and the second glass substrate 12 may exist. That is, on a front surface of the lower end portion of the display panel 10, steps may be formed due to differences in size of components constituting the display panel 10.

In order to cover and hide the steps formed in the lower end portion of the display panel 10, a cover 17 (hereafter referred to as a "step cover") may be provided at the lower end portion of the display panel 10. The step cover 17 may also cover and hide the inactive areas of the display panel 10.

The step cover 17 may be integrated into the display panel 10 at the lower end portion of the display panel 10 to form the lower end portion of the display panel 10, and a front surface of the step cover 17 may form the front surface of the display panel 10. That is, in the current example embodiment, the front surface of the step cover 17 may be coplanar with the front surface of the first polarizing film 13.

Accordingly, the steps formed in the lower end portion of the display panel 10 may be hidden by the step cover 17, and the front surface of the step cover 17 may be coplanar with the front surface of the display panel 10, as described above, so that the front surface of the display panel 10 is coplanar.

A typical display apparatus needs a bezel of a predetermined width or more in order to hide steps and inactive areas in the end portion of a display panel. However, in the current example embodiment, since the step cover 17 forms the lower end portion of the display panel 10, the front surface of the display panel 10 may become coplanar, and accordingly, it is possible to significantly reduce a width of a bezel since the bezel does not need to hide the steps and the inactive areas. As a result, the display apparatus 1 having a bezel of a minimum width can be implemented.

In the current example embodiment, the step cover 17 may be formed of a photocurable resin, more specifically, an ultraviolet curing resin that is hardened by ultraviolet light.

Hereinafter, a process of forming the step cover 17 will be described in detail with reference to FIGS. 4, 5, 6, and 7.

Figure 4:
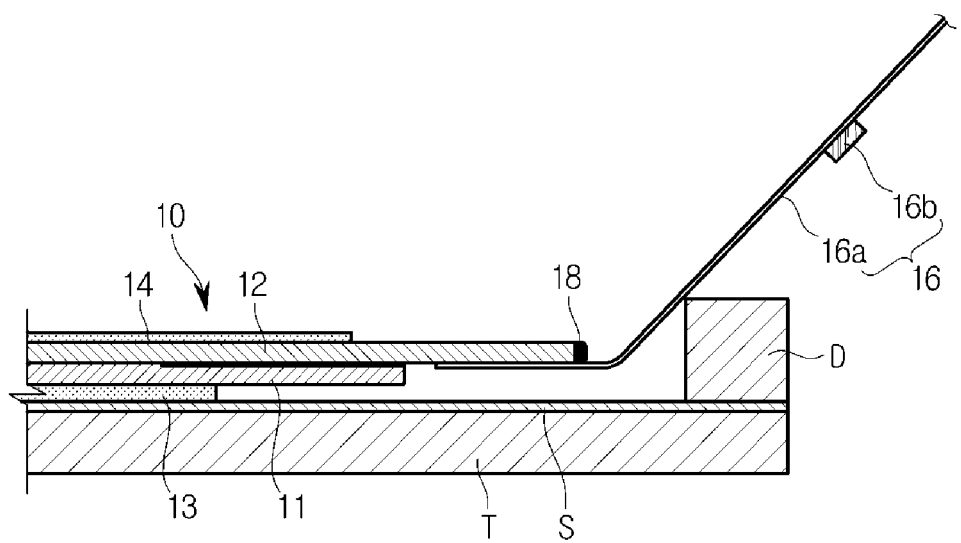
FIGS. 4 5, 6, and 7 are schematic views illustrating a process of forming a step cover in the display apparatus according to the example embodiment.

As shown in FIG. 4, a silicon film S which is not adhered on the photocurable resin may be disposed on an upper surface of a transparent plate T formed of a transparent material such as glass to transmit light. The silicon film S may also transmit light. Also, a dam member D may be disposed on an upper surface of the silicon film S to fill the photocurable resin in a liquid state in predetermined space.

Figure 5:
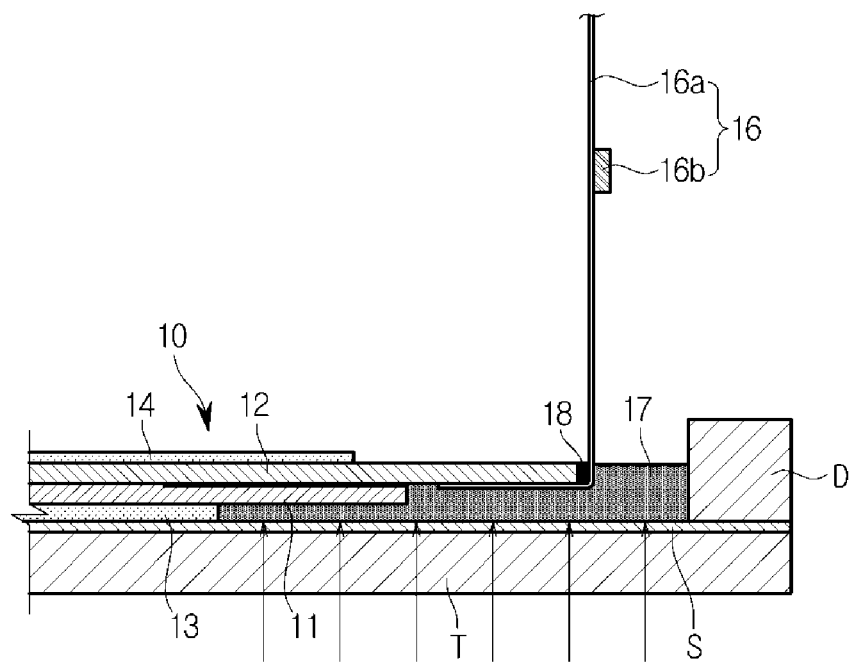

The display panel 10 may be put on the transparent plate T and the silicon film S, and then, an adhesive material 18 may be applied on a lower end (in FIG. 5, a right end) of the second glass substrate 12, as shown in FIG. 5. Then, the COFs 16 may be bent at 90 degrees upward with respect to the lower end of the second glass substrate 12, so that ends of the COFs 16 are adhered on the lower end of the second glass substrate 12 through the adhesive material 18, as shown in FIG. 6.

Figure 6:
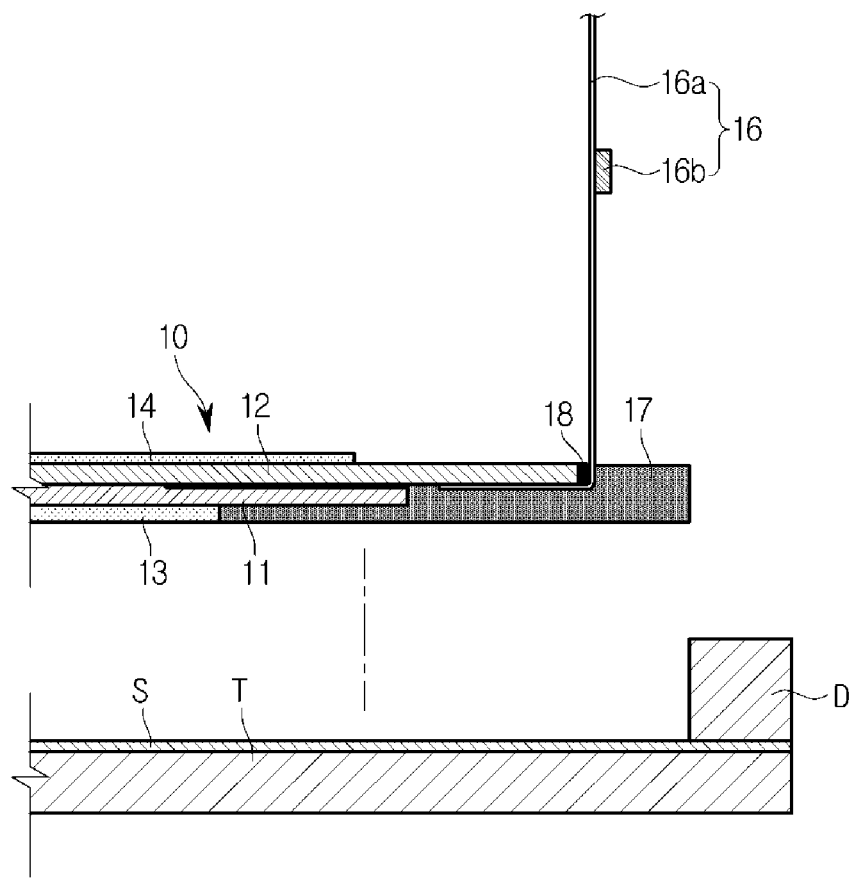

After the COFs 16 are completely adhered on the second glass substrate 12, a photocurable resin (17) in a liquid state may be filled in space between the display panel 10 and the dam member D such that a height of the photocurable resin nearly corresponds to that of the rear surface (in FIG. 6, an upper surface) of the second glass substrate 12, as shown in FIG. 6.

Since the photocurable resin is in a liquid state, as described above, the photocurable resin may flow into space between the silicon film S and the first glass substrate 11 and space between the silicon film S and the second glass substrate 12.

In this state, if light (ultraviolet) is radiated from a lower surface of the transparent plate T toward an upper surface of the transparent plate T, the photocurable resin may be hardened to form the step cover 17. At this time, since the display panel 10 is placed on the transparent plate T and the silicon film S, the front surface (in FIG. 6, a lower surface) of the step cover 17 may be coplanar with the front surface of the display panel 10.

Also, since the step cover 17 is formed by hardening the photocurable resin filling the space between the silicon film S and the second glass substrate 12 and between the lower end of the second glass substrate 12 and the dam member D, ends of the COFs 16 connected to the second glass substrate 12, the bent portions of the COFs 16, and the adhered portions of the COFs 16 may be supported by the step cover 17. Accordingly, the step cover 17 may cover and hide the ends of the COFs 16 connected to the second glass substrate 12, while supporting the ends of the COFs 16.

Figure 7:
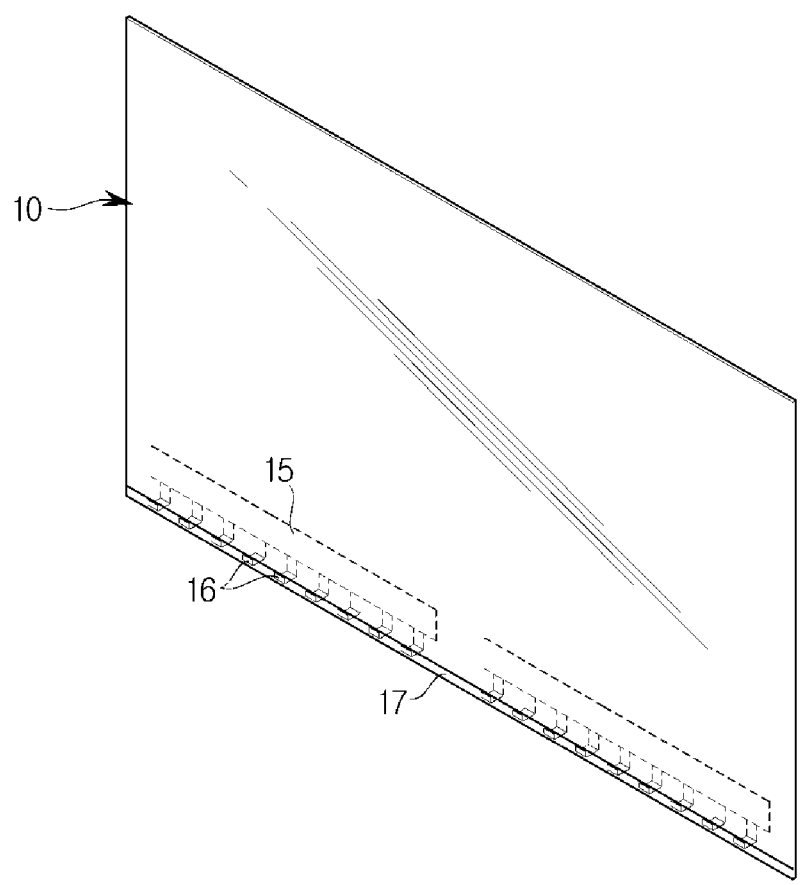

After the step cover 17 is formed, the display panel 10 may be moved upward, as shown in FIG. 7, to separate the display panel 10 and the step cover 17 from the silicon film S, thereby completing operation of forming the step cover 17.

In the current example embodiment, the COFs 16 may be connected to the lower end of the display panel 10, and the step cover 17 may be formed in the lower end of the display panel 10 to correspond to the connection portions of the COFs 16. However, this is only an example, and the step cover 17 may form an end of the display panel 10 corresponding to the connection portions of the COFs 16.

Figure 8:
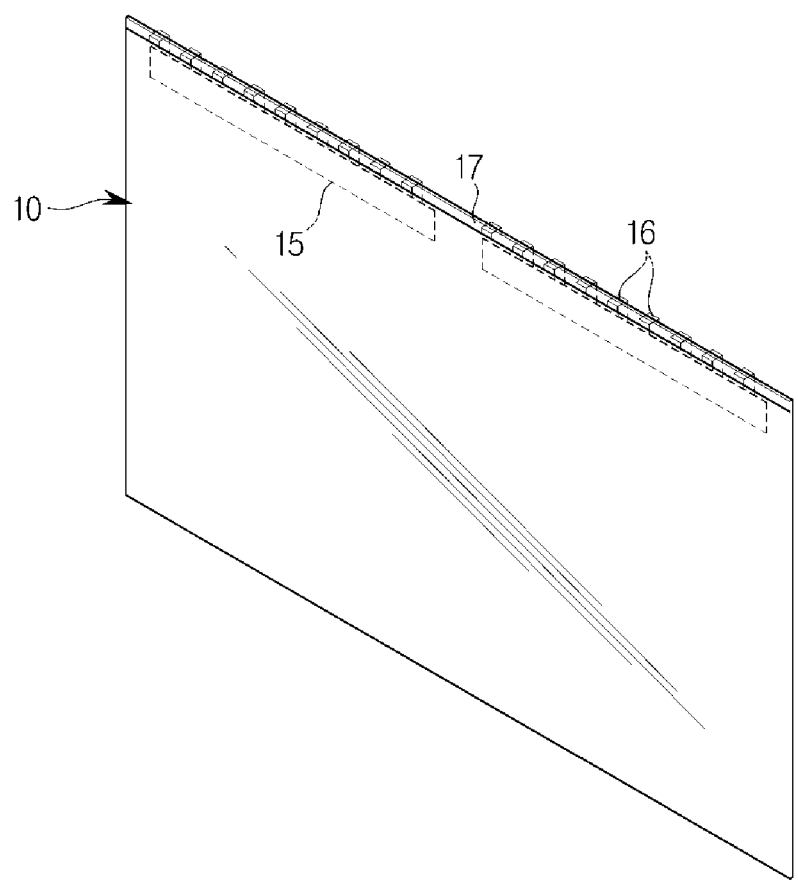
FIG. 8 is a perspective view illustrating a display panel, a COF, and a source Printed Circuit Board in a display apparatus according to another example embodiment.

As shown in FIG. 8, if the COFs 16 are connected to an upper end of the display panel 10, the step cover 17 may cover a front surface of an upper end of the second glass substrate 12 so as to form an upper end of the display panel 10.

Figure 9:
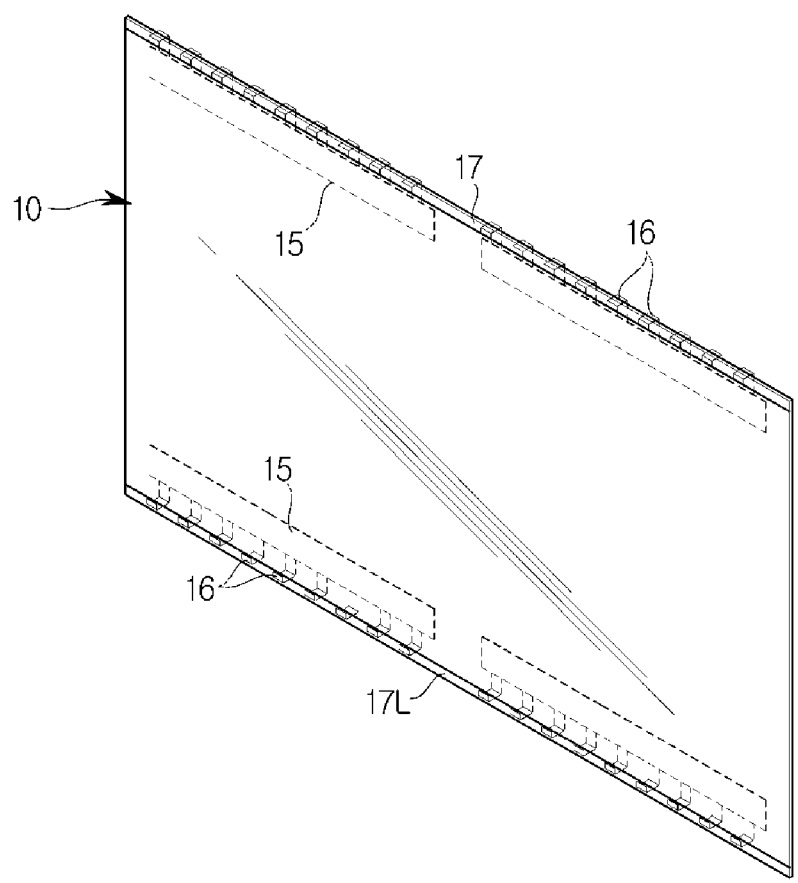
FIG. 9 is a perspective view illustrating a display panel, a COF, and a source Printed Circuit Board in a display apparatus according to another example embodiment.

Also, as shown in FIG. 9, if the COFs 16 are connected to the upper and lower ends of the display panel 10, a first cover (first step cover) 17U may cover the exposed front surface of the upper end of the second glass substrate 12 so as to form an upper end of the display panel 10, and a second cover (second step cover) 17L may cover the exposed front surface of the lower end of the second glass substrate 12 so as to form an lower end of the display panel 10.

Also, the COFs 16 may be connected to left and right ends of the display panel 10. In this case, step covers may form left and right ends of the display panel 10.

Also, in the current example embodiment, since ends of the COFs 16 are connected to the front surface of the lower end of the second glass substrate 12, the step cover 17 may function to hide the ends of the COFs 16, although embodiments are not limited to this. However, the step cover 17 may be formed to hide the step formed between the first glass substrate 11 and the second glass substrate 12 without any components corresponding to the COFs 16.

Also, in the current example embodiment, steps may be respectively formed between the first glass substrate 11 and the second glass substrate 12 and between the lower end of the first glass substrate 11 and the lower end of the first polarizing film 13. However, no step may be formed between the lower end of the first glass substrate 11 and the first polarizing film 13.

As described above, in the display apparatus according to the example embodiments, since the step cover covers and hides the step formed in an end portion of the display panel, and the front surface of the display panel is coplanar by the step cover, the bezel does not need to hide the step. As a result, a display apparatus having a bezel of a minimum width can be implemented.

Although a few example embodiments have been shown and described, it will be appreciated by those skilled in the art that changes may be made in these example embodiments without departing from the principles and spirit of the disclosure, the scope of which is defined in the claims and their equivalents.

What is claimed is:

1. A display apparatus comprising:
   a display panel configured to display a screen, the display panel comprising:
   a first glass substrate;
   a second glass substrate disposed behind the first glass substrate, wherein an end portion of the second glass substrate extends past an end of the first glass substrate such that the end portion of the second glass substrate is not overlapped by the first glass substrate;
   a cover that covers a front surface of the end portion of the second glass substrate, wherein a front surface of the cover is coplanar with a front surface of the display panel;
   a chip on film (COF) having an end connected to the front surface of the end portion of the second glass substrate; and
   an adhesive applied on an end of the second glass substrate,
   wherein the COF is bent with respect to the end of the second glass substrate, and
   wherein the cover contacts and covers a bent portion of the COF.

2. The display apparatus according to claim 1, wherein the display panel further comprises:
   a first polarizing film disposed on a front surface of the first glass substrate, a front surface of the first polarizing film forming the front surface of the display panel; and
   a second polarizing film disposed on a rear surface of the second glass substrate, and
   the front surface of the cover is coplanar with the front surface of the first polarizing film.

3. The display apparatus according to claim 2, wherein an end portion of the first glass substrate extends past an end of the first polarizing film such that the end portion of the first glass substrate is not overlapped by the first polarizing film, and
   the cover covers a front surface of the end portion of the first glass substrate.

4. The display apparatus according to claim 3, wherein the cover is formed of a photocurable resin.

5. The display apparatus according to claim 1, wherein the COF is adhered to the end of the second glass substrate by an adhesive material, and
   the cover supports the bent portion and an adhered portion of the COF.

6. The display apparatus according to claim 1, wherein the end portion of the second glass substrate is a lower end portion of the second glass substrate and the end of the first glass substrate is a lower end of the first glass substrate, and
   the cover covers the front surface of the lower end portion of the second glass substrate to form a lower end of the display panel.

7. The display apparatus according to claim 1, wherein the end portion of the second glass substrate is an upper end portion of the second glass substrate and the end of the first glass substrate is an upper end of the first glass substrate, and
   the cover covers the front surface of the upper end of the second glass substrate to form an upper end of the display panel.

8. The display apparatus according to claim 1, wherein a lower end portion of the second glass substrate extends past a lower end of the first glass substrate and an upper end portion of the second glass substrate extends past an upper end of the first glass substrate such that the upper end portion and the lower end portion of the second glass substrate are not overlapped by the first glass substrate, and
   the cover comprises:
   a first cover that covers a front surface of the upper end portion of the second glass substrate to form an upper end of the display apparatus; and
   a second cover that covers a front surface of the lower end portion of the second glass substrate to form a lower end of the display apparatus.

9. The display apparatus according to claim 1, wherein the display panel further comprises liquid crystals disposed between the first glass substrate and the second glass substrate.

10. The display apparatus according to claim 1, further comprising a frame case comprising a bezel configured to support edges of the display panel without overlapping the front surface of the cover.

11. A display panel comprising:
    a first glass substrate;
    a second glass substrate disposed behind the first glass substrate, wherein an end portion of the second glass substrate extends past an end of the first glass substrate such that the end portion of the second glass substrate is not overlapped by the first glass substrate;
    a first polarizing film disposed on a front surface of the first glass substrate;
    a cover that covers a front surface of the end portion of the second glass substrate, wherein a front surface of the cover is coplanar with a front surface of the first polarizing film;
    a chip on film (COF) having an end connected to the front surface of the end portion of the second glass substrate; and
    a frame case comprising a bezel configured to support edges of the display panel without overlapping the front surface of the cover,
    wherein the COF is bent, and
    wherein the cover covers a bent portion of the COF and directly contacts the bent portion of the COF.

12. The display panel according to claim 11, wherein an end portion of the first glass substrate extends past an end of the first polarizing film such that the end portion of the first glass substrate is not overlapped by the first polarizing film, and the cover covers a front surface of the end portion of the first glass substrate.

13. The display panel according to claim 11, further comprising liquid crystals disposed between the first glass substrate and the second glass substrate.

14. The display panel according to claim 13, further comprising a second polarizing film disposed on a rear surface of the second glass substrate.

* * * * *